US009151622B2

(12) United States Patent
Shin et al.

(10) Patent No.: US 9,151,622 B2
(45) Date of Patent: Oct. 6, 2015

(54) METHOD AND APPARATUS FOR ESTIMATING MOVING DIRECTION OF USER AND COMPUTER-READABLE STORAGE MEDIUM HAVING RECORDED THEREON THE METHOD

(71) Applicants: Samsung Electronics Co., Ltd., Suwon-si, Gyeonggi-do (KR); Seoul National University R&DB Foundation, Seoul (KR)

(72) Inventors: Seung-hyuck Shin, Suwon-si (KR); Chan-gook Park, Seoul (KR); Jae-myeon Lee, Yongin-si (KR); Hyun-su Hong, Seongnam-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 14/548,887

(22) Filed: Nov. 20, 2014

(65) Prior Publication Data

US 2015/0142312 A1    May 21, 2015

(30) Foreign Application Priority Data

Nov. 20, 2013    (KR) .......................... 10-2013-0141471

(51) Int. Cl.
*G01C 21/10*    (2006.01)

(52) U.S. Cl.
CPC ...................................... *G01C 21/10* (2013.01)

(58) Field of Classification Search
USPC ......................................................... 701/530
See application file for complete search history.

(56) References Cited

U.S. PATENT DOCUMENTS

| 7,962,309 B2 * | 6/2011 | Meriheina ...................... 702/141 |
| 8,229,700 B2 * | 7/2012 | Meriheina ...................... 702/160 |
| 2007/0067105 A1 * | 3/2007 | Lee et al. ....................... 701/214 |
| 2009/0326795 A1 * | 12/2009 | Supino et al. ................. 701/200 |
| 2013/0040656 A1 * | 2/2013 | Sheikh et al. .............. 455/456.1 |

FOREIGN PATENT DOCUMENTS

KR    10-0977935 B1    8/2010

\* cited by examiner

*Primary Examiner* — Thomas Tarcza
*Assistant Examiner* — Alex C Dunn
(74) *Attorney, Agent, or Firm* — Jefferson IP Law, LLP

(57) ABSTRACT

A method of estimating a moving direction of a user of an apparatus is provided. The method includes obtaining change information of acceleration according to motions of the user from an acceleration sensor mounted in an apparatus for estimating the moving direction of the user, calculating a reaction vector of force applied to a ground surface by feet of the user based on the change information of the acceleration, calculating an included angle between the moving direction of the user based on the reaction vector and an axis of a geomagnetic sensor that is included in the apparatus and detects change information of a magnetic field according to a position of the user, and determining the moving direction of the user based on a moving direction measurement value of the geomagnetic sensor mounted in the apparatus and the included angle.

20 Claims, 11 Drawing Sheets

METHOD AND APPARATUS FOR ESTIMATING MOVING DIRECTION OF USER AND COMPUTER-READABLE STORAGE MEDIUM HAVING RECORDED THEREON THE METHOD

CROSS-REFERENCE TO RELATED APPLICATION(S)

This application claims the benefit under 35 U.S.C. §119 (a) of a Korean patent application filed on Nov. 20, 2013 in the Korean Intellectual Property Office and assigned Serial number 10-2013-0141471, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Seoul National University R&DB Foundation.

TECHNICAL FIELD

The present disclosure relates to a method of estimating a moving direction of a user of an apparatus. More particularly, the present disclosure relates to a method of estimating a moving direction of a user of an apparatus from an acceleration sensor and a geomagnetic sensor included in an apparatus for estimating the moving direction of the user, a computer-readable storage medium having recorded thereon the method, and an apparatus for estimating the moving direction of the user.

BACKGROUND

A personal navigation system refers to a system for detecting a position of a person. Pedestrian Dead Reckoning (PDR) is a representative system for detecting the position by only using its own sensor without an external assistance. The PDR is a dead reckoning system developed based on an assumption that a user of an apparatus changes his or her position by walking. The PDR obtains a current position of the person estimating a moving distance based on a heading direction from an initial position by using step information of the person. Main algorithms of the PDR include a step detection algorithm, a step length estimation algorithm, and a heading estimation algorithm.

The personal navigation system is widely provided in mobile terminals, such as mobile phones, smart phones, Personal Digital Assistants (PDAs), and MP3 players, to guide a user-centered path.

In general, an apparatus that executes the personal navigation system may be configured by including a Global Positioning Satellite (GPS) receiver, a geomagnetic sensor, and an acceleration sensor in a mobile terminal. The geomagnetic sensor and the acceleration sensor may be used to estimate a position of a user of an apparatus by estimating a moving direction and a step length of the user. The geomagnetic sensor is used to detect an azimuth angle by measuring a magnitude of a magnetic field. The moving direction of the user is determined by using the azimuth angle detected through the geomagnetic sensor. In this regard, an axis of the geomagnetic sensor is assumed to match the moving direction of the user or an angle at which the mobile terminal is mounted is assumed to be known in advance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of estimating a moving direction of a user of an apparatus from an acceleration sensor and a geomagnetic sensor included in an apparatus for estimating the moving direction of the user, a computer-readable storage medium having recorded thereon the method, and the apparatus for estimating the moving direction of the user.

In accordance with an aspect of the present disclosure, a method of estimating a moving direction of a user of an apparatus is provided. The method includes obtaining change information of acceleration according to motions of the user from an acceleration sensor mounted in an apparatus for estimating the moving direction of the user, calculating a reaction vector of force applied to a ground surface by the feet of the user based on the change information of acceleration, calculating an included angle between the moving direction of the user based on the reaction vector and an axis of a geomagnetic sensor that is included in the apparatus and detects change information of a magnetic field according to a position of the user, and determining the moving direction of the user based on a moving direction measurement value of the geomagnetic sensor mounted in the apparatus and the included angle.

In accordance with another aspect of the present disclosure, an apparatus for estimating a moving direction of a user of an apparatus is provided. The apparatus includes an acceleration sensor configured to detect change information of acceleration according to motions of the user, a geomagnetic sensor configured to detect change information of a magnetic field according to a position of the user, and a controller configured to calculate a reaction vector of a force applied to a ground surface by the feet of the user based on the change information of acceleration calculated based on the motions of the user detected by the acceleration sensor, to calculate an included angle between the moving direction of the user and an axis of the geomagnetic sensor based on the reaction vector, and to determine the moving direction of the user based on a moving direction measurement value of the geomagnetic sensor mounted in the apparatus and the included angle.

In accordance with another aspect of the present disclosure, a non-transitory computer-readable recording medium is provided. The computer-readable recording medium has recorded thereon a computer program codes, which, when executed by a processor, performs a method of estimating a moving direction of a user of an apparatus. The method includes obtaining change information of acceleration according to motions of the user from an acceleration sensor mounted in an apparatus for estimating the moving direction of the user, calculating a reaction vector of force applied to a ground surface by the feet of the user based on the change information of acceleration, calculating an included angle between the moving direction of the user based on the reaction vector and an axis of a geomagnetic sensor that is included in the apparatus and detects change information of a magnetic field according to a position of the user, and determining the moving direction of the user based on a moving direction measurement value of the geomagnetic sensor mounted in the apparatus and the included angle.

As long as a motion of the apparatus is detected according to the motions of the user, the moving direction of the user may be determined with respect to the user, regardless of a carrying position of the apparatus.

As long as a motion of the apparatus is detected according to the motions of the user, the moving direction of the user may be determined regardless of a posture angle of the apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
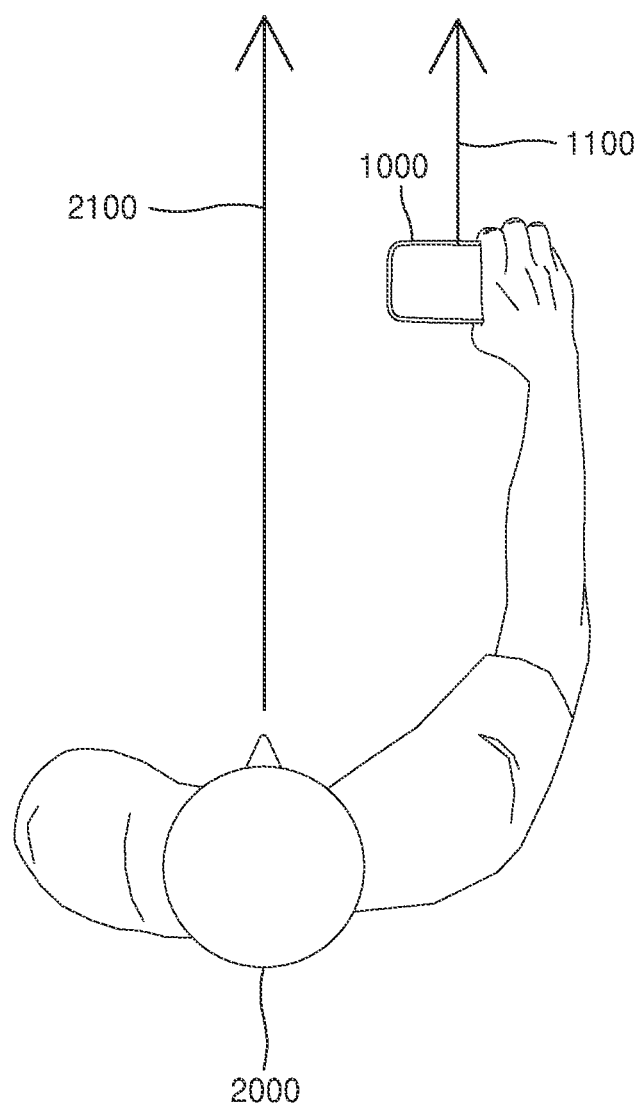
FIGS. 1, 2, and 3 are conceptual diagrams of an axis of a geomagnetic sensor mounted in a mobile terminal in a personal navigation system and an actual moving direction of a user of an apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first", "second", etc., may be used to describe various components, such components must not be limited to the above terms. The above terms are used only to distinguish one component from another.

The terms used in the present specification are merely used to describe various embodiments of the present disclosure, and are not intended to limit the present disclosure. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Reference will now be made in detail to various embodiments of the present disclosure, examples of which are illustrated in the accompanying drawings. Like reference numerals refer to like elements throughout, and thus, their description will be omitted.

Figure 2:
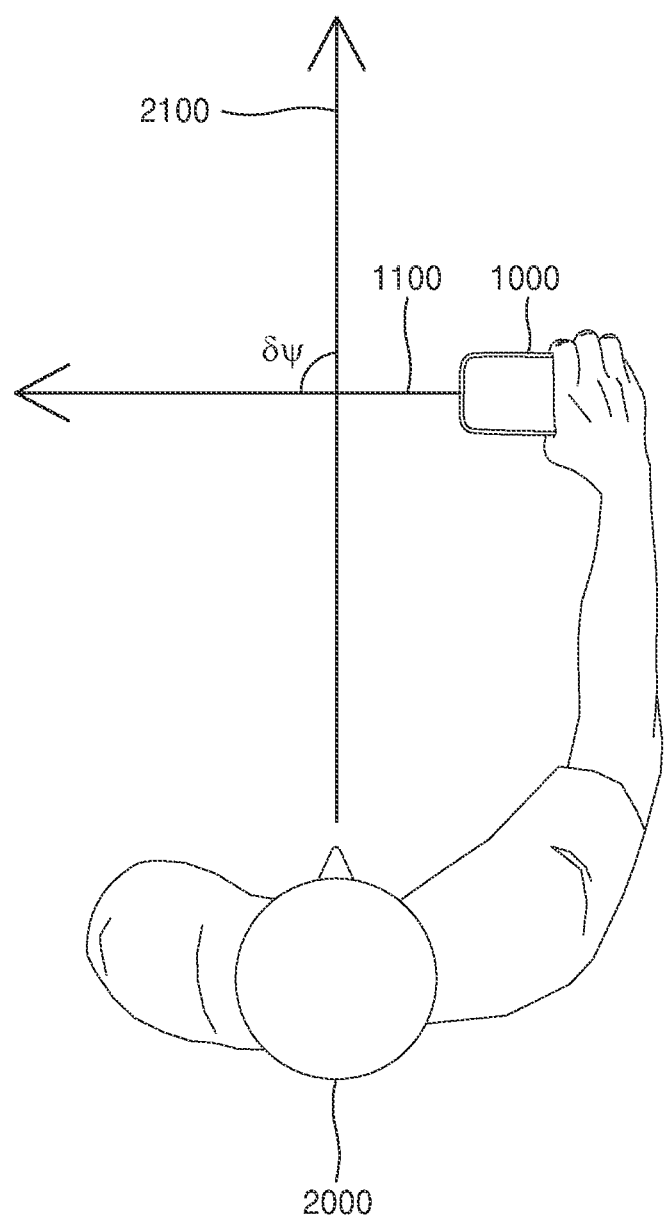
Figure 3:
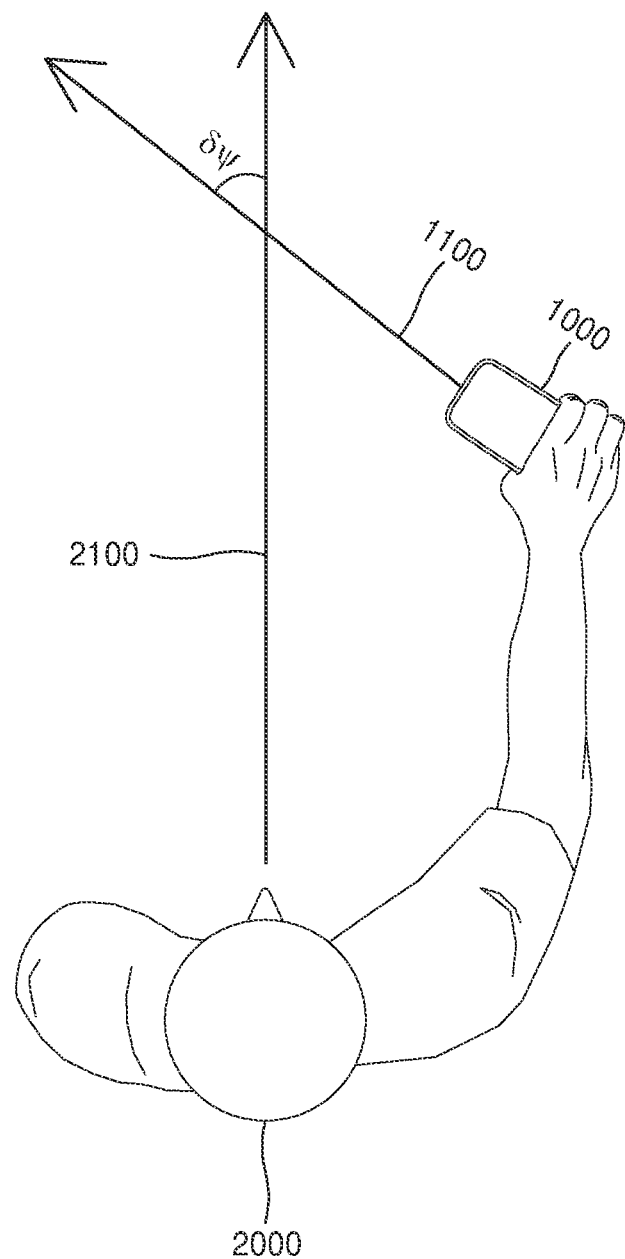

FIGS. 1, 2, and 3 are conceptual diagrams of an axis of a geomagnetic sensor mounted in a mobile terminal in a personal navigation system and an actual moving direction of a user of an apparatus according to various embodiments of the present disclosure.

Referring to FIG. 1, in an apparatus that executes the personal navigation system, it may be assumed that an axis 1100 of a geomagnetic sensor mounted in a mobile terminal 1000 basically matches a moving direction 2100 of a user of an apparatus 2000 carrying the mobile terminal 1000. Accordingly, information regarding the moving direction 2100 of the user 2000 may be obtained based on a direction of the axis 1100 of the geomagnetic sensor of the mobile terminal 1000.

However, referring to FIGS. 2 and 3, the axis 1100 of the geomagnetic sensor provided in the mobile terminal 1000 may not match the moving direction 2100 of the user 2000 according to various carrying positions of the mobile terminal 1000 and a posture of the user 2000. In this case, an angle $\delta\psi$ may be calculated between the axis 1100 of the geomagnetic sensor and the moving direction 2100 of the user 2000.

As can be seen from FIGS. 2 and 3, the information regarding the moving direction 2100 of the user 2000 may not be accurately obtained by the geomagnetic sensor of the mobile terminal 1000.

Figure 4:
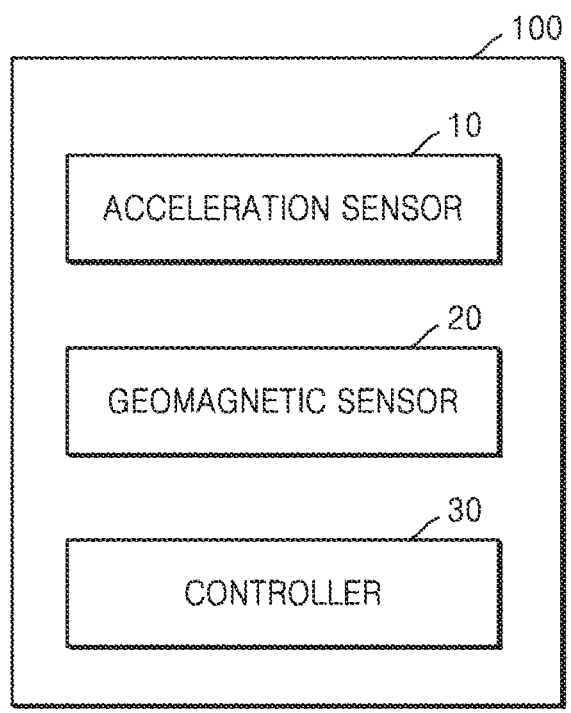
FIG. 4 is a block diagram of an apparatus for estimating a moving direction of a user of an apparatus, according to an embodiment of the present disclosure.

FIG. 4 is a block diagram of an apparatus for estimating a moving direction of a user of an apparatus according to an embodiment of the present disclosure.

Referring to FIG. 4, the apparatus 100 according to an embodiment of the present disclosure may be included in the mobile terminal 1000, such as a mobile phone, a smart phone, a Personal Digital Assistant (PDA), or an MP3 player.

The apparatus 100 may include an acceleration sensor 10, a geomagnetic sensor 20, and a controller 30.

The acceleration sensor 10 may detect change information of acceleration according to a motion of a user of an apparatus carrying the apparatus 100. The acceleration sensor 10 may process output signals and thus measure dynamic forces of a body, for example, acceleration, vibration, or impact. The acceleration sensor 10 may be an inertial type, a gyro type, and a silicon semiconductor type according to a detection method. An intensity scale or an inclinometer may also be regarded as a type of the acceleration sensor 10. The acceleration sensor 10 has 3 axes. An input value of each axis may be an acceleration vector.

The motion of the user may include walking of the user, as described below with reference to FIGS. 7A, 7B, 7C, and 7D.

The change information of acceleration may be detected from the acceleration sensor 10. When the user walks, similar patterns occur periodically. The number of walking steps may be counted by counting a maximum point in each pattern from a starting point of walking.

The geomagnetic sensor 20 may detect change information of a magnetic field according to a position of the user carrying the apparatus 100.

The geomagnetic sensor 20 may have 3 axes that may detect a magnitude of a geomagnetic field and thus obtain an azimuth angle. A relative moving direction of the user with respect to a reference direction may be determined by using the azimuth angle detected by the geomagnetic sensor 20.

The controller 30 may calculate a reaction vector of a force applied to the ground surface by the feet of the user from the change information of acceleration based on the motion of the user detected by the acceleration sensor 10, and may calculate an included angle between the moving direction of the user determined based on the calculated reaction vector and an axis of the geomagnetic sensor 20.

For example, when the motion of the user includes the walking motion of the user, and the controller 30 determines that the user is walking, the acceleration sensor 10 may calculate the change information of acceleration according to the walking steps of the user. The controller 30 may convert the calculated change information of acceleration from a local coordinate system expressed in a body frame in which an arbitrary position of a mobile terminal is the origin, into a reference coordinate system expressed in a navigation frame in which an arbitrary position on the ground surface is the origin. This operation is described below with reference to FIGS. 8, 9, and 10.

A method of estimating a moving direction of a user of an apparatus according to an embodiment of the present disclosure may determine an actual moving direction of the user regardless of a carrying position of a mobile terminal that the user is carrying on the assumption that the user is movingling while carrying the mobile terminal that includes an apparatus for estimating the moving direction of the user.

For example, referring to FIGS. 1, 2, and 3, the user 2000 may hold the mobile terminal 1000 with his/her hand while looking at a display unit of the mobile terminal 1000.

Even when the user 2000 puts the mobile terminal 1000 at various locations, such as a pants pocket or a bag, the actual moving direction of the user 2000 may be determined by using the apparatus 100 of the mobile terminal 1000.

Likewise, the method of estimating the moving direction of the user according to an embodiment of the present disclosure may determine an actual moving direction of the user by using the apparatus for estimating the moving direction of the user included in the mobile terminal regardless of a posture angle of the mobile terminal in the body frame in which an arbitrary position of the mobile terminal is the origin. The controller 30 may also calculate a reaction vector in which a vertical component of the converted change information of acceleration corresponds to a maximum point having a value higher than a predetermined critical value.

The controller 30 may also calculate the reaction vector and determine an azimuth angle of the moving direction of the user based on the calculated reaction vector.

The controller 30 may also calculate a difference between the azimuth angle of the moving direction of the user and an azimuth angle of an axis of the geomagnetic sensor 20 in the reference coordinate system. In this case, the axis of the geomagnetic sensor 20 may be an axis in the body frame.

Figure 5:
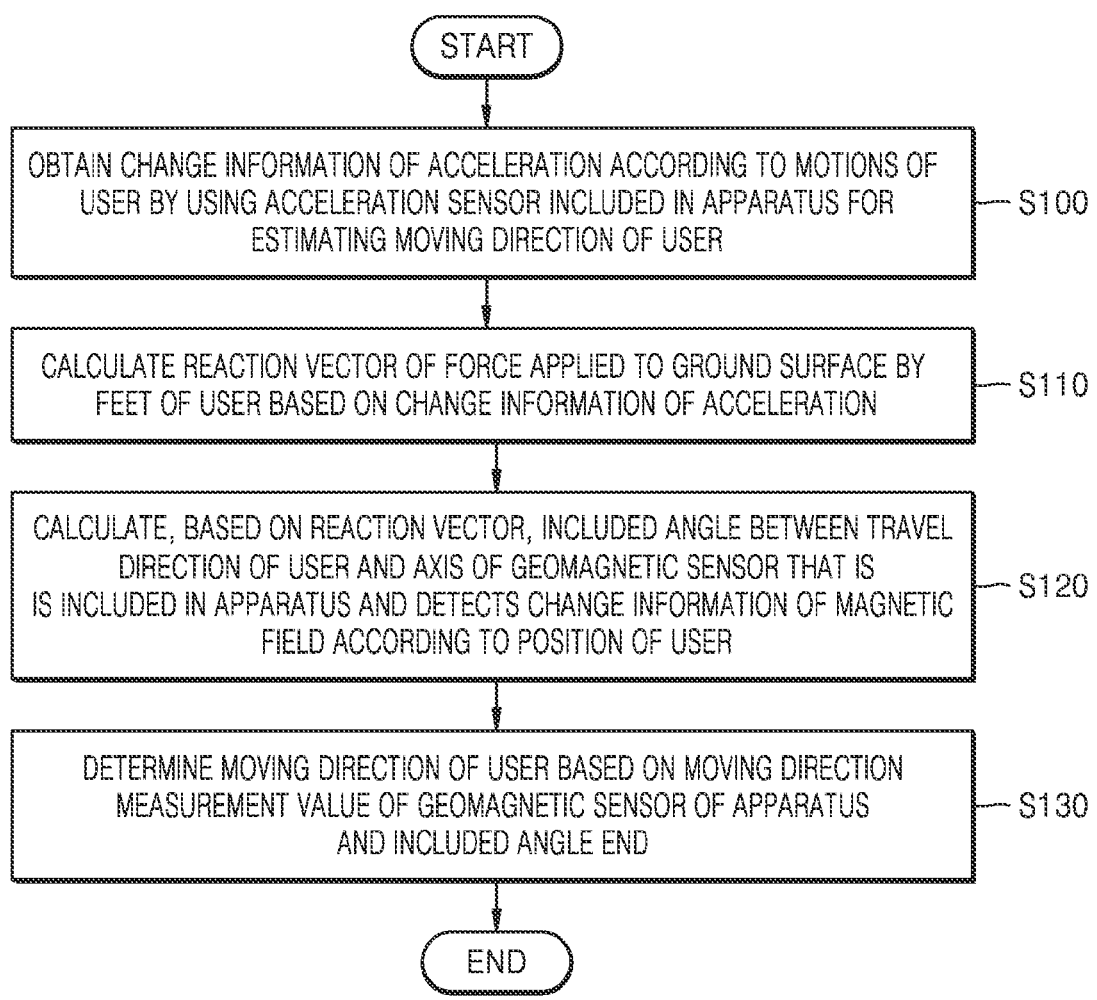
FIGS. 5 and 6 are flowcharts of a method of estimating a moving direction of a user of an apparatus according to various embodiments of the present disclosure.
Figure 6:
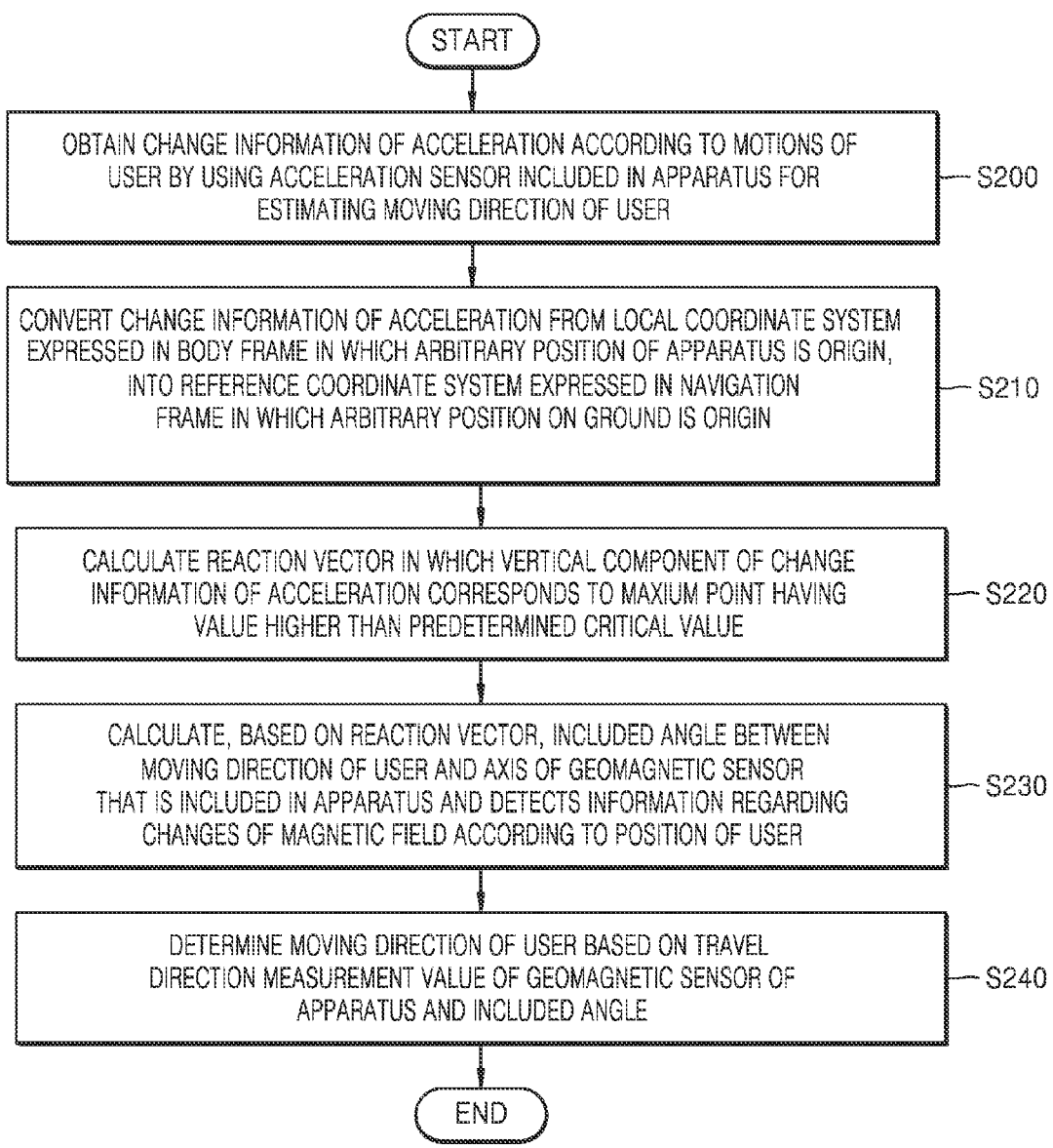

FIGS. 5 and 6 are flowcharts of a method of estimating a moving direction of a user of an apparatus according to various embodiments of the present disclosure.

FIG. 5 is a flowchart of the method of estimating a moving direction of a user of an apparatus according to an embodiment of the present disclosure.

Referring to FIG. 5, in operation S100, the apparatus 100 calculates change information of acceleration according to a motion of the user by using an acceleration sensor of a mobile terminal.

For example, when the motion of the user includes a walking motion of the user and it is determined that the user is walking, the change information of acceleration according to the walking step of the user may be calculated.

The change information of acceleration may also include an acceleration vector that is the input value of each axis of the acceleration sensor according to the motion of the user.

The calculated change information of acceleration may be converted from a local coordinate system expressed in a body frame in which an arbitrary position of the apparatus 100 is the origin, into a reference coordinate system expressed in a navigation frame in which an arbitrary position on the ground surface is the origin.

Accordingly, a method of estimating a moving direction of a user of an apparatus according to an embodiment of the present disclosure may determine an actual moving direction of the user regardless of a carrying position of a mobile terminal that the user is carrying on the assumption that the user is movingling while carrying the mobile terminal that includes an apparatus for estimating the moving direction of the user.

The method of estimating the moving direction of the user may determine the moving direction of the user regardless of the position of the user carrying the apparatus 100 with respect to the user as long as motions of the apparatus 100 are detected according to the motions of the user.

For example, referring to FIGS. 1, 2, and 3, the user 2000 may hold the mobile terminal 1000 with his/her hand while looking at a display unit of the mobile terminal 1000.

Even when the user 2000 puts the mobile terminal 1000 at various locations, such as a pants pocket or a bag, the actual moving direction of the user 2000 may be determined by using the apparatus 100 of the mobile terminal 1000.

Likewise, the method of estimating the moving direction of the user according to an embodiment of the present disclosure may determine an actual moving direction of the user by using the apparatus for estimating the moving direction of the user included in the mobile terminal regardless of a posture angle of the mobile terminal in the body frame in which an arbitrary position of the mobile terminal is the origin.

In the method of estimating the moving direction of the user according to an embodiment of the present disclosure, the moving direction of the user may be determined regardless of a posture angle of the apparatus 100 as long as the motions of the apparatus 100 are detected according to the motions of the user. This is described below with reference to FIGS. 8, 9, and 10.

In operation S110, the apparatus 100 calculates a reaction vector of a force applied to the ground surface by the feet of a user of an apparatus from change information of acceleration calculated in operation S100.

In general, the reaction vector is a reaction of the force applied to the ground surface by the feet of the user. The reaction vector may exist when the user walks and the feet of the user touch the ground surface according to the walking motion of the user.

For example, a reaction vector in which a vertical component of an acceleration vector that is the calculated change information of acceleration corresponds to a maximum point having a value higher than a predetermined critical value may be calculated. In this case, the vertical component of the acceleration vector may be the greatest when a foot away from the ground surface touches the ground surface while the user is moving.

In operation S120, the apparatus 100 calculates an included angle between the moving direction of the user based on the reaction vector calculated in operation S110 and an axis of a geomagnetic sensor of the apparatus 100 which detects change information of a magnetic field according to a position of the user. For example, the reaction vector may be calculated and a difference between the azimuth angle of the moving direction of the user and an azimuth angle of the axis of the geomagnetic sensor may be calculated in a reference coordinate system based on a direction of the calculated reaction vector.

In operation S130, the apparatus 100 determines the moving direction of the user based on the included angle calculated in operation S120 and a moving direction measurement value of the geomagnetic sensor of the apparatus 100.

The moving direction of the user may be determined based on the moving direction measurement value of the geomagnetic sensor of the mobile terminal, which detects the change information of the magnetic field according to the position of the user. For example, the reaction vector may be calculated and the azimuth angle of the moving direction of the user may be determined based on the calculated reaction vector.

FIG. 6 is a flowchart of a method of estimating a moving direction of a user of an apparatus according to an embodiment of the present disclosure.

Referring to FIG. 6, in operation S200, the apparatus 100 calculates change information of acceleration by using an acceleration sensor of the apparatus 100. Since operation S200 corresponds to operation S100 of FIG. 5, a detailed description thereof will be omitted.

In operation S210, the apparatus 100 converts the change information of acceleration calculated in operation S200 from a local coordinate system expressed in a body frame in which an arbitrary position of a mobile terminal is the origin, into a reference coordinate system expressed in a navigation frame in which an arbitrary position on the ground surface is the origin.

In the body frame, an arbitrary position of the mobile terminal 1000 may be the origin. An axis of the body frame may be an axis of the geomagnetic sensor of the mobile terminal. For example, when an X-axis of the geomagnetic sensor is a right direction of the mobile terminal and a Z-axis of the geomagnetic sensor is an upper direction of the mobile terminal, a Y-axis of the geomagnetic sensor may be an outer product direction of the Z-axis and the X-axis (i.e., a Z×X direction vector).

The navigation frame may be a North-East-Down (NED) coordinate system in which an arbitrary position on the ground surface is the origin, an N-axis is north, an E-axis is east, and a D-axis is a central direction of the Earth. For example, an acceleration vector according to a motion of the user in the body frame may be converted into an acceleration vector according to a motion of the user in the navigation frame.

Accordingly, the method of estimating the moving direction of the user according to an embodiment of the present disclosure may determine an actual moving direction of the user regardless of a position of the user carrying the mobile terminal on the assumption that the user is movingling while carrying the mobile terminal including the apparatus 100.

The method of estimating the moving direction of the user may determine the moving direction of the user regardless of a carrying position of the apparatus 100 with respect to the user as long as a motion of the apparatus 100 is detected according to the motion of the user.

For example, referring to FIGS. 1, 2, and 3, the user 2000 may hold the mobile terminal 1000 with his/her hand while looking at a display unit of the mobile terminal 1000.

Even when the user 2000 puts the mobile terminal 1000 at various locations, such as a pants pocket or a bag, the actual moving direction of the user 2000 may be determined by using the apparatus 100 of the mobile terminal 1000.

Likewise, the method of estimating the moving direction of the user according to an embodiment of the present disclosure may determine an actual moving direction of the user by using the apparatus for estimating the moving direction of the user included in the mobile terminal regardless of a posture angle of the mobile terminal in the body frame in which an arbitrary position of the mobile terminal is the origin According to the method of estimating the moving direction of the user according to an embodiment of the present disclosure, as long as the motions of the apparatus 100 are detected according to the motions of the user, the moving direction of the user may be determined regardless of the posture angle of the apparatus 100. This is described below with reference to FIGS. 8, 9, and 10.

In operation S220, the apparatus 100 calculates the information regarding the changes of acceleration converted in operation S210, having a vertical component that corresponds to a maximum value higher than a predetermined critical value, as a reaction vector.

In general, the reaction vector is a reaction of the force transmitted to the ground by the feet of the user. The reaction vector may exist when the user walks and the feet of the user touch the ground.

In this case, among a motion that forms a walking step of the user, the vertical component of the acceleration vector may be the greatest in a heel-strike state where a foot away from the ground surface touches the ground surface.

According to an embodiment of the present disclosure, when the vertical component of the acceleration vector according to the motion of the user corresponds to the maximum point having a value higher than a predetermined critical value, the acceleration vector may be calculated as the reaction vector.

For example, the reaction vector may be calculated in the NED coordinate system which is an example of the navigation frame.

In operation S230, the apparatus 100 calculates an included angle between the moving direction of the user and an axis of the geomagnetic sensor of the apparatus 100 which detects the change information of the magnetic field according to the position of the user based on a direction of the reaction vector calculated in operation S220. In this case, the axis of the geomagnetic sensor may be an axis in the body frame.

For example, an azimuth angle ψsensor of a Y-axis that is an axis of the geomagnetic sensor may be calculated in the NED coordinate system which is the example of the navigation frame. In this case, the azimuth angle ψsensor may be calculated by converting the Y-axis of the geomagnetic sensor of the apparatus 100 in the body frame into an NED coordinate system that is the reference coordinate system.

In operation 240, the apparatus 100 determines the moving direction of the user by using the included angle calculated in operation S230 and a moving direction measurement value of the geomagnetic sensor of the apparatus 100.

For example, the included angle according to an embodiment of the present disclosure may be a difference between the azimuth angle of the moving direction of the user and an azimuth angle of an axis of the geomagnetic sensor in the reference coordinate system.

For example, an azimuth angle ψuser of the moving direction of the user may be determined by setting the N-axis of the NED coordinate system, which is the reference coordinate system, as a reference direction.

Accordingly, when the axis of the geomagnetic sensor does not match the moving direction of the user, an angle δψ between the axis of the geomagnetic sensor in the NED coordinate system and the moving direction of the user may be calculated by using a difference between the azimuth angle of the axis of the geomagnetic sensor reference coordinate system and the azimuth angle of the moving direction of the user. This is described below with reference to FIG. 11.

FIGS. 7A, 7B, 7C, and 7D are conceptual diagrams illustrating change information of acceleration calculated by a controller based on a motion of the user 2000 detected by an acceleration sensor of the mobile terminal 1000, according to an embodiment of the present disclosure.

Referring to FIGS. 7A, 7B, 7C, and 7D, the motion of the user 2000 may include a walking motion of the user 2000. When it is determined that the user 2000 is walking, the change information of acceleration according to the walking motion of the user 2000 may be calculated.

For example, the walking motion of the user 2000 may include 4 level motions. The walking motion of the user 2000 may include a stance state shown in FIG. 7A where both feet of the user 2000 are touching the ground surface, a heel-off state shown in FIG. 7B where a heel of a foot is off the ground surface, a swing state shown in FIG. 7C where the foot is supported by the ground surface, and a heel-strike state shown in FIG. 7D where the foot is touching the ground surface.

In this case, when it is determined that the user 2000 is walking, the change information of acceleration according to each motion of the user 2000 detected by the acceleration sensor of the mobile terminal 1000 may be calculated. For example, the change information of acceleration according to an embodiment of the present disclosure may be presented as an acceleration vector $f^b$ 200 according to the motion of the user in a body frame.

Figure 8:
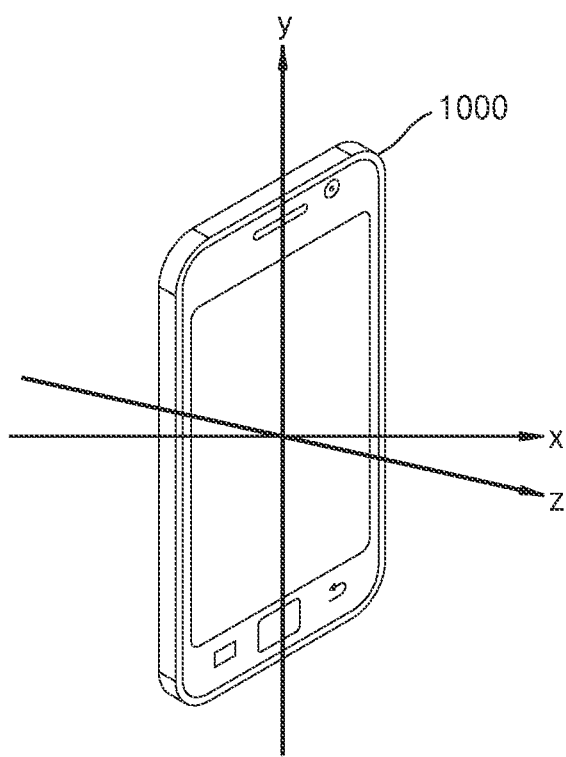
FIGS. 8, 9, and 10 are conceptual diagrams of converting acceleration change information from a body frame into a navigation frame in a controller of an apparatus for estimating a moving direction of a user of an apparatus according to various embodiments of the present disclosure.
Figure 9:
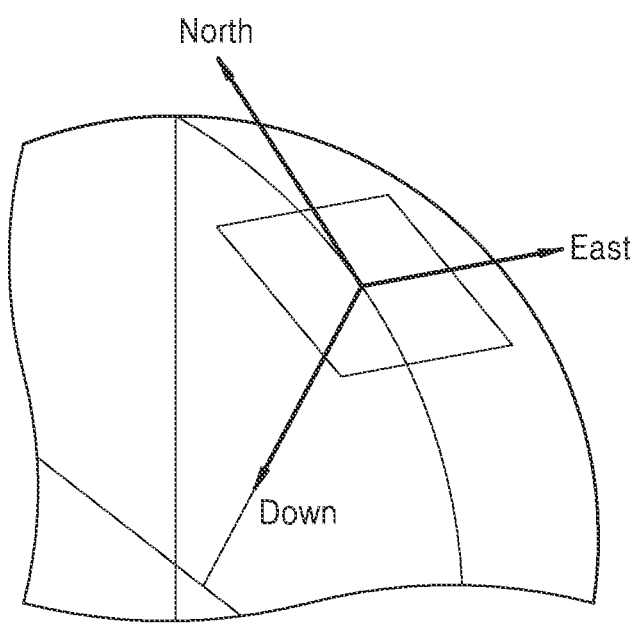
Figure 10:
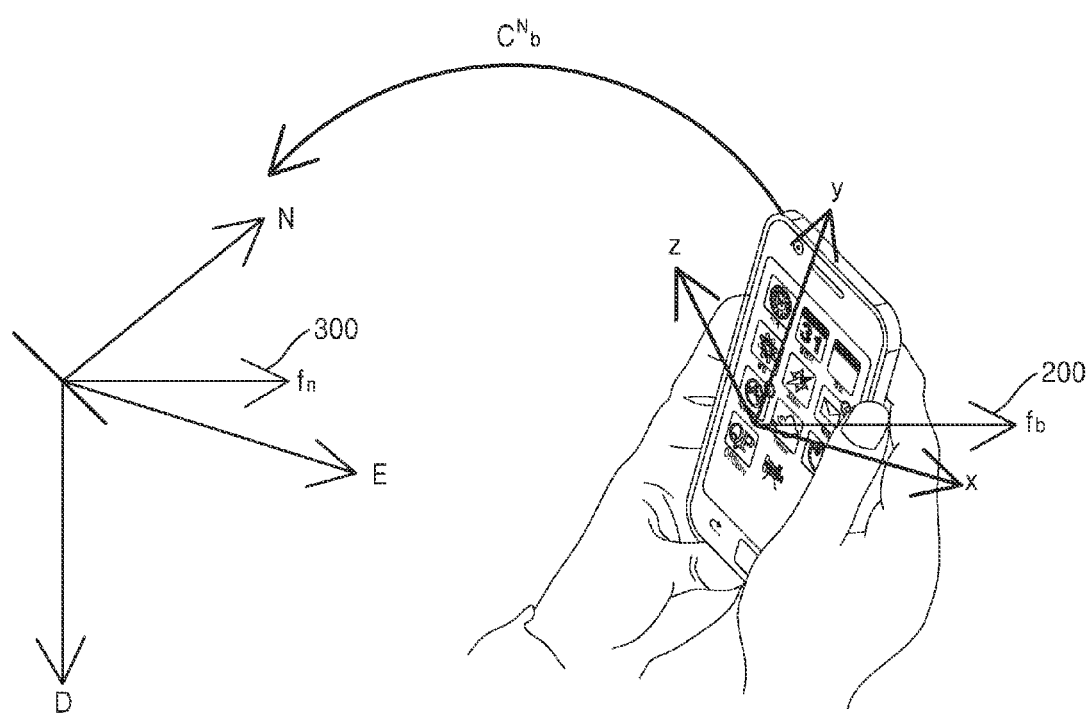

FIGS. 8, 9, and 10 are conceptual diagrams of converting change information of acceleration from a body frame into a navigation frame in a controller of an apparatus according to various embodiments of the present disclosure.

Referring to FIG. 8, in the body frame, an arbitrary position of a mobile terminal 1000 may be the origin, and an axis of the body frame may be an axis of a geomagnetic sensor of the mobile terminal 1000. For example, when an X-axis of the geomagnetic sensor is a right direction of the mobile terminal 1000 and a Z-axis of the geomagnetic sensor is an upper direction of the mobile terminal 1000, a Y-axis of the geomagnetic sensor may be an outer product direction of the Z-axis and the X-axis, that is, a Z×X direction vector.

Referring to FIG. 9, the navigation frame may be an NED coordinate system in which an arbitrary position on the ground surface is the origin, the N-axis is north, the E-axis is east, and the D-axis is a central direction of the Earth.

Referring to FIG. 10, the change information of acceleration calculated by the acceleration sensor of the mobile terminal 1000 may be converted from a local coordinate system expressed in the body frame into a reference coordinate system expressed in the navigation frame.

$$f^N = C_b^N f^b \qquad \text{Equation 1}$$

The acceleration vector $f^b$ 200 according to a motion of the user in the body frame may be converted into an acceleration vector $f^N$ 300 according to a motion of the user in the navigation frame.

In general, the reaction vector is a reaction of the force transmitted to the ground by the feet of the user. Referring to FIGS. 7A, 7B, 7C, and 7D, the reaction vector may exist when the user 2000 is walking and the feet of the user 2000 touch the ground surface.

Figure 7:
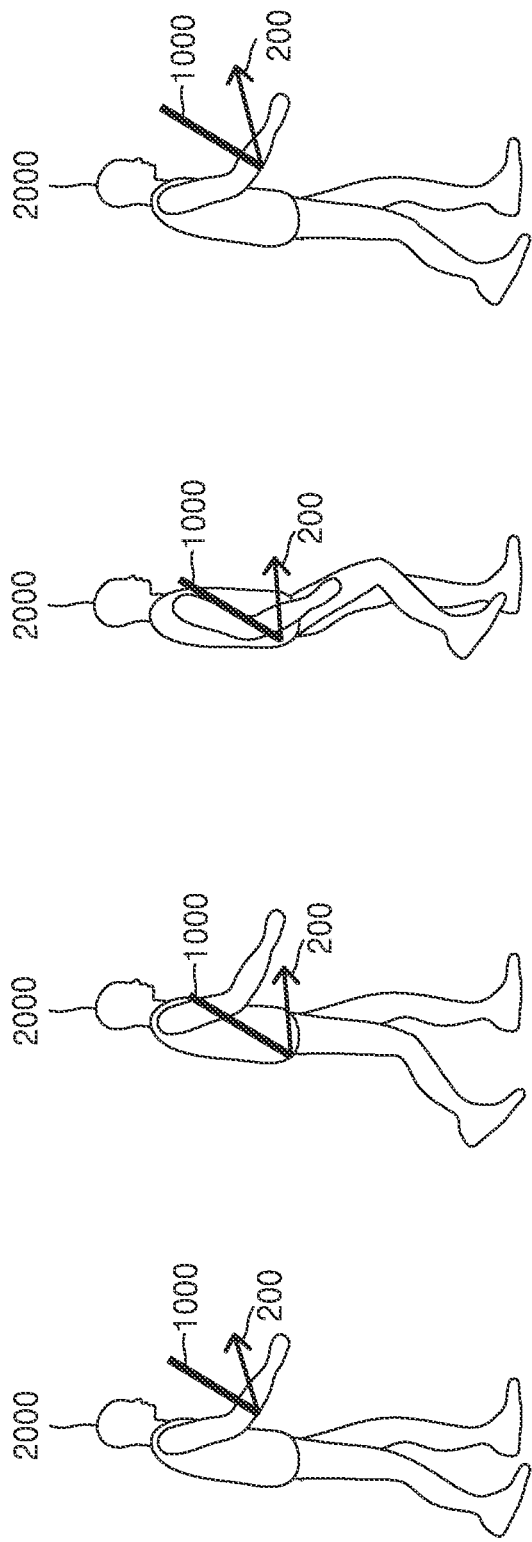
FIGS. 7A, 7B, 7C, and 7D are conceptual diagrams illustrating change information of acceleration calculated by a controller based on a motion of a user of an apparatus detected by an acceleration sensor of an apparatus for estimating a moving direction of the user according to an embodiment of the present disclosure.

In this case, among the 4 motions forming a single walking motion of the user 2000 as shown in FIGS. 7A, 7B, 7C, and 7D, a vertical component $f^d$ of the acceleration vector $f^N$ 300 may be the greatest in a heel-strike state as shown in FIG. 7D where the foot away from the ground touches the ground surface.

According to an embodiment of the present disclosure, the acceleration vector $f^N$ 300 that has a maximum point of the vertical component $f^d$ for each walking motion of the user may be calculated as a reaction vector. In this case, the maximum point of the vertical component $f^d$ of each walking motion of the user may have a value higher than a predetermined critical value.

The maximum point of the vertical component $f^d$ of the acceleration vector $f^N$ 300 may be calculated for each walking motion of the user. At least one walking motion sample may be necessary to estimate the moving direction of the user, and thus one or more maximum points having values higher than the predetermined critical value may be calculated.

Accordingly, when the vertical component $f^d$ of the acceleration vector $f^N$ 300 is the maximum point having a value higher than the predetermined critical value, the acceleration vector $f^N$ 300 may be calculated as the reaction vector. When a direction of the reaction vector is calculated, an included angle between the moving direction of the user and an axis of the geomagnetic sensor may be calculated.

Figure 11:
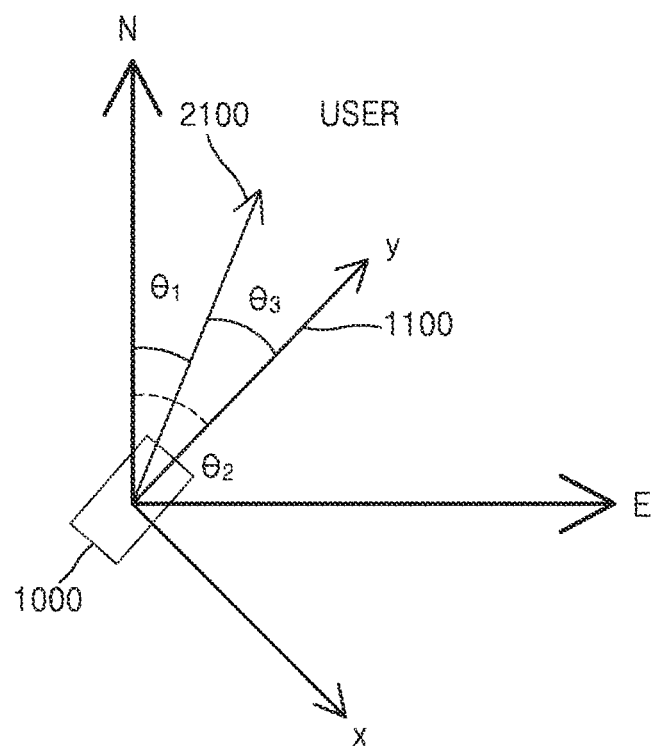
FIG. 11 is a diagram of an example of calculating an included angle between a moving direction of a user of an apparatus and an axis of a geomagnetic sensor in a controller of an apparatus for estimating the moving direction of the user according to an embodiment of the present disclosure.

FIG. 11 is a diagram of an example of calculating an included angle between a moving direction of a user of an apparatus and an axis of a geomagnetic sensor in a controller of an apparatus according to an embodiment of the present disclosure.

Referring to FIG. 11, the azimuth angle ψsensor of a Y-axis that is an axis of the geomagnetic sensor may be calculated in an NED coordinate system which is a reference coordinate system.

For example, the azimuth angle ψsensor may be calculated by converting the Y-axis of the geomagnetic sensor of the apparatus 100 in a body frame into the NED coordinate system that is the reference coordinate system.

Accordingly, when the axis 1100 of the geomagnetic sensor does not match the moving direction 2100 of the user 2000, an angle δψ between the axis 1100 of the geomagnetic sensor and the moving direction 2100 of the user 2000 may be calculated by using a difference between an azimuth angle of the axis 1100 of the geomagnetic sensor in the reference coordinate system and an azimuth angle of the moving direction 2100 of the user 2000.

$$\psi sensor = \theta_2 \quad \text{Equation 2}$$

$$\delta\psi = \psi sensor - \psi user = \theta_2 - \theta_1 = \theta_3 \quad \text{Equation 3}$$

Accordingly, according to an embodiment of the present disclosure, even when the axis 1100 of the geomagnetic sensor of the mobile terminal 1000 and the moving direction 2100 of the user 2000 does not match according to various carrying positions of the mobile terminal 1000 and a posture of the user 2000, performance of estimating the moving direction 2100 of the user 2000 may be improved.

The device described herein may comprise a processor, a memory for storing and executing program data, a permanent storage unit such as a disk drive, a communication port for handling communications with external devices, and user interface devices, including a touch panel, keys, buttons, and the like.

When software modules or algorithms are involved, these software modules may be stored as program instructions or computer-readable codes executable on a processor on a computer-readable recording medium. Examples of the computer-readable recording medium include magnetic storage media (e.g., read only memory (ROM), random access memory (RAM), floppy disks, hard disks, etc.), and optical recording media (e.g., compact disc ROMs (CD-ROMs), digital versatile disks (DVDs), etc.). The computer-readable recording medium can also be distributed over network coupled computer systems so that the computer-readable code is stored and executed in a distributive manner. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the present disclosure, reference has been made to the various embodiments illustrated in the drawings, and specific language has been used to describe these various embodiments. However, no limitation of the scope of the present disclosure is intended by this specific language, and the present disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent functional relationships according to the related art and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical."

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of estimating a moving direction of a user of an apparatus, the method comprising:
    obtaining change information of acceleration according to motions of the user from an acceleration sensor mounted in an apparatus for estimating the moving direction of the user;
    calculating a reaction vector of force applied to a ground surface by feet of the user based on the change information of the acceleration;
    calculating an included angle between the moving direction of the user based on the reaction vector and an axis of a geomagnetic sensor that is included in the apparatus and detects change information of a magnetic field according to a position of the user; and
    determining the moving direction of the user based on a moving direction measurement value of the geomagnetic sensor mounted in the apparatus and the included angle.

2. The method of claim 1,
    wherein the motions of the user comprise a walking motion of the user, and wherein the obtaining of the change information of the acceleration comprises, when the user is determined to be walking, obtaining change information of acceleration according to the walking motion of the user.

3. The method of claim 1, wherein the obtaining of the change information of the acceleration comprises converting the change information of the acceleration from a local coordinate system expressed in a body frame in which an arbitrary position of the apparatus is an origin, into a reference coordinate system expressed in a navigation frame in which an arbitrary position on the ground surface is an origin.

4. The method of claim 1, wherein the calculating of the reaction vector comprises calculating the reaction vector in which a vertical component of the obtained change information of the acceleration corresponds to a maximum point having a value higher than a predetermined critical value.

5. The method of claim 1, wherein the determining of the moving direction of the user comprises determining an azimuth angle of the moving direction of the user based on the moving direction measurement value of the geomagnetic sensor mounted in the apparatus and the included angle.

6. The method of claim 1,
wherein the calculating of the included angle comprises calculating a difference between an azimuth angle of the moving direction of the user and an azimuth angle of the axis of the geomagnetic sensor in the reference coordinate system, based on a direction of the reaction vector, and
wherein the axis of the geomagnetic sensor is an axis of the body frame.

7. The method of claim 1, wherein as long as a motion of the apparatus is detected according to the motions of the user, the moving direction of the user is determined with respect to the user, regardless of a carrying position of the apparatus.

8. The method of claim 1, wherein as long as a motion of the apparatus is detected according to the motions of the user, the moving direction of the user is determined regardless of a posture angle of the apparatus.

9. An apparatus for estimating a moving direction of a user of an apparatus, the apparatus comprising:
an acceleration sensor configured to detect change information of acceleration according to motions of the user;
a geomagnetic sensor configured to detect change information of a magnetic field according to a position of the user; and
a controller configured to calculate a reaction vector of a force applied to a ground surface by feet of the user based on the change information of the acceleration calculated based on the motions of the user detected by the acceleration sensor, to calculate an included angle between the moving direction of the user and an axis of the geomagnetic sensor based on the reaction vector, and to determine the moving direction of the user based on a moving direction measurement value of the geomagnetic sensor mounted in the apparatus and the included angle.

10. The apparatus of claim 9,
wherein the motions of the user comprises a walking motion of the user, and
wherein, when the controller determines that the user is walking, the acceleration sensor calculates the change information of the acceleration according to the walking motion of the user.

11. The apparatus of claim 9, wherein the controller converts the change information of the acceleration from a local coordinate system expressed in a body frame in which an arbitrary position of the apparatus is an origin, into a reference coordinate system expressed in a navigation frame in which an arbitrary position on the ground surface is an origin.

12. The apparatus of claim 9, wherein the controller calculates the reaction vector in which a vertical component of the obtained change information of the acceleration corresponds to a maximum point having a value higher than a predetermined critical value.

13. The apparatus of claim 9, wherein the controller determines an azimuth angle of the moving direction of the user based on the moving direction measurement value of the geomagnetic sensor mounted in the apparatus and the included angle.

14. The apparatus of claim 9, wherein the controller calculates a difference between an azimuth angle of the moving direction of the user and an azimuth angle of the axis of the geomagnetic sensor in the reference coordinate system, based on a direction of the reaction vector, and
wherein the axis of the geomagnetic sensor is an axis of the body frame.

15. The apparatus of claim 9, wherein as long as a motion of the apparatus is detected according to the motions of the user, the moving direction of the user is determined with respect to the user, regardless of a carrying position of the apparatus.

16. The apparatus of claim 9, wherein as long as a motion of the apparatus is detected according to the motions of the user, the moving direction of the user is determined regardless of a posture angle of the apparatus.

17. A non-transitory computer-readable recording medium having recorded thereon computer program codes, which, when executed by a processor, perform a method of estimating a moving direction of a user of an apparatus, wherein the method comprises:
obtaining change information of acceleration according to motions of the user from an acceleration sensor mounted in an apparatus for estimating the moving direction of the user;
calculating a reaction vector of force applied to a ground surface by feet of the user based on the change information of the acceleration;
calculating an included angle between the moving direction of the user based on the reaction vector and an axis of a geomagnetic sensor that is included in the apparatus and detects change information of a magnetic field according to a position of the user; and
determining the moving direction of the user based on a moving direction measurement value of the geomagnetic sensor mounted in the apparatus and the included angle.

18. The computer-readable recording medium of claim 17, wherein the motions of the user comprises a walking motion of the user, and
wherein the obtaining of the change information of the acceleration comprises, when the user is determined to be walking, obtaining the change information of the acceleration according to the walking motion of the user.

19. The computer-readable recording medium of claim 17, wherein the obtaining of the change information of the acceleration comprises converting the change information of the acceleration from a local coordinate system expressed in a body frame in which an arbitrary position of the apparatus is an origin, into a reference coordinate system expressed in a navigation frame in which an arbitrary position on the ground surface is an origin.

20. The computer-readable recording medium of claim 17, wherein the calculating of the reaction vector comprises:

calculating a maximum point at which a vertical component of the obtained change information of the acceleration has a value higher than a predetermined critical value; and calculating the reaction vector corresponding to the calculated maximum point.

* * * * *